(12) United States Patent
Morimoto et al.

(10) Patent No.: US 6,181,406 B1
(45) Date of Patent: Jan. 30, 2001

(54) ACTIVE MATRIX LIQUID CRYSTAL DISPLAY DEVICE

(75) Inventors: Hirokazu Morimoto; Takaomi Tanaka, both of Hyogo-ken; Tetsuya Nishino, Himeji; Satoru Narioka, Fukaya, all of (JP)

(73) Assignee: Kabushiki Kaisa Toshiba, Kawasaki (JP)

( * ) Notice: Under 35 U.S.C. 154(b), the term of this patent shall be extended for 0 days.

(21) Appl. No.: 09/145,496

(22) Filed: Sep. 2, 1998

(30) Foreign Application Priority Data

Sep. 12, 1997 (JP) .................................................. 9-248604
Dec. 4, 1997 (JP) .................................................. 9-334364

(51) Int. Cl.$^7$ ........................ G02F 1/1335; G02F 1/1339
(52) U.S. Cl. ............................ 349/155; 349/106; 349/138
(58) Field of Search .................................. 349/155, 156, 349/106, 138, 42

(56) References Cited

U.S. PATENT DOCUMENTS

| | | | | |
|---|---|---|---|---|
| 5,646,756 | * | 7/1997 | Dohjo et al. ............................ | 349/42 |
| 5,680,187 | * | 10/1997 | Nagayama et al. ................... | 349/156 |
| 5,748,266 | * | 5/1998 | Kodate .................................. | 349/155 |
| 5,757,451 | * | 5/1998 | Miyazaki et al. ..................... | 349/106 |
| 5,815,232 | * | 9/1998 | Miyazaki et al. ..................... | 349/155 |
| 5,859,683 | * | 1/1999 | Tagusa et al. ........................ | 349/138 |
| 5,870,157 | * | 2/1999 | Shimada et al. ..................... | 349/106 |
| 5,914,761 | * | 6/1999 | Ohe et al. ............................. | 349/138 |

FOREIGN PATENT DOCUMENTS

| | | |
|---|---|---|
| 4-93924 | 3/1992 | (JP) . |
| 9-073088 | 3/1997 | (JP) . |
| 9-120075 | 5/1997 | (JP) . |

* cited by examiner

Primary Examiner—Kenneth Parker
(74) Attorney, Agent, or Firm—Pillsbury Madison & Sutro LLP

(57) ABSTRACT

A liquid crystal display device has a liquid crystal panel wherein an opposite substrate includes a plurality of pillar-shaped spacers opposing scanning lines provided on an array substrate. The spacers have distal ends which contact the scanning lines with an opposite electrode of the opposing substrate being interposed between the distal ends and the scanning lines. Each of the distal ends of the spacers has a width smaller than the width of each scanning line. Pixel electrodes have notches which are formed in those of their side edges which are opposite to the scanning lines, such that the notches are located opposite to the distal ends of the spacers. The distance between the side edges of the pixel electrode and the scanning line opposing the side edges is larger at regions around the distal ends of the spacers than other regions.

14 Claims, 4 Drawing Sheets

ACTIVE MATRIX LIQUID CRYSTAL DISPLAY DEVICE

BACKGROUND OF THE INVENTION

The present invention relates to an active matrix liquid crystal display device which includes wiring lines arranged in a matrix, and pixel electrodes disposed in regions surrounded by the wiring lines and connected to the pixel electrodes through switching elements.

In general, an active matrix liquid crystal display device of a light transmission type has an array substrate, an opposite substrate, and a liquid crystal composition held between the array substrate and the opposite substrate.

The array substrate has the following structure: a plurality of signal lines and a plurality of gate lines are arranged on a glass substrate in a matrix manner, and thin film transistors (hereinafter referred to as TFTs) are provided at the intersections of the signal lines and gate lines. Pixel electrodes formed of Indium Tine Oxide (hereinafter referred to as ITO) are arranged in regions surrounded by the signal lines and gate lines, and connected to the signal gate lines through switching elements, respectively.

On the other hand, the opposite substrate has the following structure: a black matrix pattern formed of light-shielding material such as Cr is formed on a glass substrate, and red (R), green (G), and blue (B) colored layers are formed as color filters on the black matrix pattern. Furthermore, an opposite electrode formed of a transparent conductive film of, e.g., ITO is formed on the colored filters.

The array substrate and opposite substrate are adhered to each other with a predetermined gap, and a liquid crystal composition is sealed in the gap between the array and opposite substrates, thereby forming the liquid crystal display device. In addition, spacers are arranged between the array and opposite substrates in order to keep those substrates apart from each other by the predetermined gap.

In recent years, liquid crystal display devices have been provided which use pillar-shaped spacers, instead of spherical spacers. More specifically, in these display devices, the opposite substrate has a plurality of pillar-shaped spacers projecting toward the array substrate, and distal ends of the spacers are located to contact the wiring lines of the array substrate, e.g., the gate lines, thereby keeping the gap between the array and opposite substrates, i.e., a cell gap, at a predetermined value.

Each of the pillar-shaped spacers is formed of colored layers which have successively been stacked. On the spacers, the opposite electrode formed of ITO are arranged.

By virtue of the above structure, the pillar-shaped spacers can be selectively arranged on the gate lines which are non-display regions. The spherical spacers cannot be arranged in such a manner. In this regard, the liquid crystal display device using the pillar-shaped spacers is more advantageous than the liquid crystal display device using the spherical spacers.

However, in the above liquid crystal display device using the pillar-shaped spacers, when an external force is applied to the liquid crystal display device and the array and opposite substrates are displaced from each other, the spacers are greatly moved relative to the array substrate. In particular, this is remarkable in recent liquid crystal display devices in which the array and opposite substrates are formed of thinner transparent substrates in order for the devices to have smaller weights. Those devices themselves have lower strengths, and are easily deformed due to external impact. When the spacers are moved relative to the array substrate, the opposite electrode covering the spacers is brought into contact with the pixel electrodes of the array substrate, causing a short-circuit and generating luminance spots.

BRIEF SUMMARY OF THE INVENTION

The present invention has been made in consideration of the above circumstances and its object is to provide an active matrix liquid crystal display device which can prevent generation of luminance spots even if an external force is applied to the display device, thereby to obtain a display image having high quality.

In order to attain the above object, the liquid crystal display device according to the present invention comprises:

an array substrate including wiring lines arranged in a matrix and a plurality of pixel electrodes which are arranged in regions surrounded by the wiring lines and connected to the wiring lines through switching elements;

an opposite substrate including an opposite electrode and opposing the array substrate; and a liquid crystal composition sealed between the array substrate and the opposite substrate.

The opposite substrate further includes a plurality of pillar-shaped spacers which project to contact the array substrate through the opposing electrode and have distal ends located opposite to the wiring lines. Each of the distal ends has a width smaller than a width of each of the wiring lines. The distance between each of the pixel electrodes located near the distal ends of the spacers and the corresponding wiring lines opposing the pixel electrodes is larger at regions around the distal ends of the spacers than other regions.

Furthermore, in the liquid crystal display device, the pixel electrodes have outer edges which are located opposite to the wiring lines, and which have notches formed in those portions of the outer edges which are opposite to the distal ends of the spacers.

As mentioned above, according to the active matrix liquid crystal display device, the distance between the wiring line and that portion of the pixel electrode which is opposite to the spacer is greater than the distance between the wiring line and that portion of the pixel electrode which is other than the portion of the pixel electrode which is opposite to the spacer. For example, the notch is formed in that portion of the outer edge of the pixel electrode which is opposite to the distal end of the spacer, as a result of which the distance between the wiring line and the above portion of the outer edge is greater than the distance between the wiring line and the other portion of the outer edge.

By virtue of this feature, the distances between the distal ends of the spacers and the pixel electrodes are set to be great while lowering of the aperture ratio is restricted to a minimum. Thus, the pixel electrode and the opposite electrode covering the spacer can be prevented from contacting with each other and short-circuiting, even if the array substrate and the opposite substrate are deformed due to an external force and the spacers move over the array substrate.

Moreover, the generation of luminance spots and the like can be prevented and thus the display image is also prevented from being degraded, even if the inside of the device is greatly deformed due to external impact as a result of increasing in size of the screen and decreasing in thickness of the substrates which are intended to reduce the weight of the device.

Another active matrix liquid crystal display device according to the present invention comprises:

an array substrate including wiring lines arranged in a matrix and a plurality of pixel electrodes which are disposed in regions surrounded by the wiring lines and connected to the wiring lines trough switching elements, respectively;

an opposite substrate including an opposite electrode and opposing the array substrate; and a liquid crystal composition sealed between the array substrate and the opposite substrate.

The opposite substrate further includes a plurality of pillar-shaped spacers which project to contact the array substrate through the opposing electrode and have distal ends located opposite to the wiring lines. The array substrate has a plurality of transparent insulating layers which are arranged on regions contacting the distal ends of the spacers, which have areas each greater than the area of each of the distal ends of the spacers. At least a part of each insulating layer extends over the pixel electrode.

In the active matrix liquid crystal display device having the above-mentioned construction, the insulating layers are arranged on regions contacting or close to the distal ends of the spacers covered by the opposing electrode, and have areas each of which is sufficiently greater than the area of each distal end. Due to this feature, even if the array substrate and the opposite substrate are deformed due to an external force and the spacers move over the array substrate, the insulating layers are always located between the spacers and the pixel electrodes and thus the pixel electrodes and the opposite electrode are prevented from short-circuiting.

Therefore, luminance spots are prevented from generating and thus the display image is also prevented from being degraded, even if the display device is greatly deformed due to external impact as a result of increasing in size of the screen and decreasing in thickness of the substrates which are intended to reduce the weight of the device.

Furthermore, the liquid crystal display device has the insulating layers having sufficiently great areas, and thus prevent the pixel electrodes and the opposite electrode from locally short-circuiting, even if surface portions of the array and opposite substrates are non-uniformly deformed during manufacturing process thereof.

Moreover, in the liquid crystal display device, each of the insulating layers is transparent, and has a transmittance of 30% or more. Thus, even if the insulating layer is arranged to overlap the pixel electrode, an excellent display image can be obtained without reducing the aperture ratio. In addition, the thickness of each of the insulating layers is set at 2 μm or less. Thus, they do not disorder the orientation of the liquid crystal, although they have steps. Therefore, an image having high quality is maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show an active matrix liquid crystal display device according to a first embodiment of the present invention, in which:

FIG. 1 is a schematic plan view of the liquid crystal display device,

FIG. 2 is a schematic plan view of a part of an array substrate of the liquid crystal display device, FIG. 3 is an enlarged plan view showing a part of the array substrate, FIG. 4 is a cross-sectional view taken along line IV—IV of FIG. 2, and FIG. 5 is a cross-sectional view taken along line V—V of FIG. 2;

FIGS. 6 to 8 show an active matrix liquid crystal display device according to a second embodiment of the present invention, in which:

FIG. 6 is a schematic plan view of the liquid crystal display device, FIG. 7 is a cross-sectional view taken along line VII—VII of FIG. 6, and FIG. 8 is a cross-sectional view taken along line VIII—VIII of FIG. 6.

DETAILED DESCRIPTION OF THE INVENTION

An active matrix liquid crystal display device according to a first embodiment of the present invention will be explained in detail with reference to the accompanying drawings.

Figure 1:
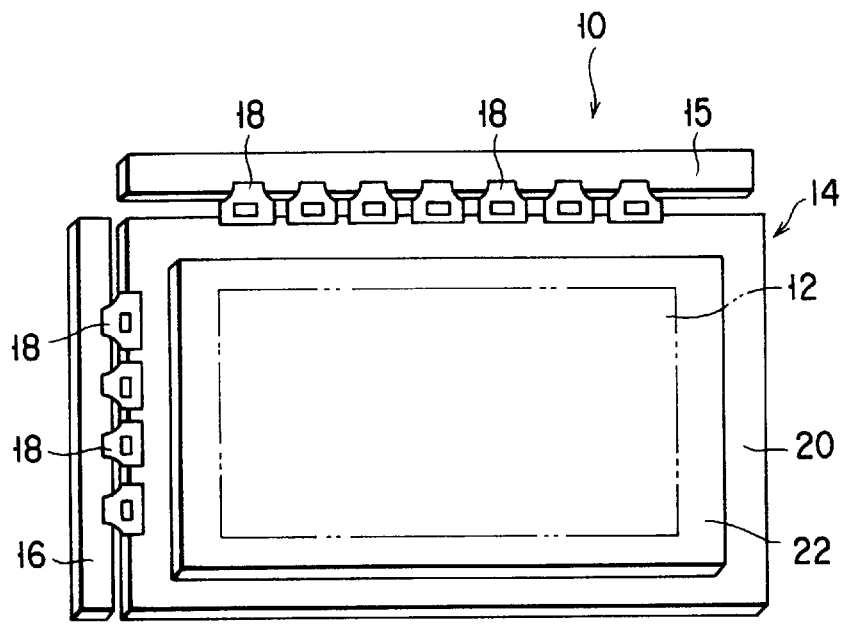

In the first embodiment, as shown in FIG. 1, an active matrix liquid crystal display device 10 is constructed as a light transmission type which is normally in a white mode. The liquid crystal display device 10 has a display region 12 having a diagonal length of, e.g., 11.3 inches.

The display device 10 comprises a liquid crystal panel 14, signal line and scanning line driving circuit boards 15 and 16 for driving the liquid crystal panel 14, and a plurality of tape carrier packages (hereinafter each referred to as a TCP) 18 which electrically connect the liquid crystal panel 14 and the driving circuit boards 15 and 16.

As shown in FIGS. 1 to 5, the liquid crystal panel 14 comprises an array substrate 22 and an opposite substrate 20, which are adhered to each other at their peripheral portions by a seal agent (not shown) so that they are opposite to each other with a predetermined gap. A twisted nematic liquid crystal composition 26 is sealed as a light modulation layer between the array substrate 22 and the opposite substrate 20, with an orientation film 23 interposed between the composition 26 and the opposite substrate 20, and an orientation film 24 interposed between the array substrate 22 and the composition 26.

Polarizing plates 28 and 30 are respectively provided on outer surfaces of the array substrate 20 and opposite substrate 22 such that their polarization axes are perpendicular to each other. However, the orientation films 23 and 24 and the polarizing plates 28 and 30 may be omitted if a polymer dispersed type of liquid crystal is used as the liquid crystal composition 26.

As shown in FIGS. 2 to 5, the array substrate 20 has a glass substrate 31 on which 640×3 signal lines 32 and 480 scanning lines 34 are arranged as wiring lines in a matrix manner such that the signal lines 32 extend substantially perpendicular to the scanning lines 34. Pixel electrodes 36 formed of ITO are disposed in the respective regions surrounded by the signal lines 32 and the scanning lines 34, and connected to the intersections of the signal and scanning lines 32 and 34 through TFTs 38 serving as switching elements.

Each of the pixel electrodes 36 has a substantially rectangular shape, and has a pair of side edges opposite to associated two signal lines 32 and a pair of side edges opposite to associated two scanning lines 34.

The glass substrate 31 has a small thickness of, e.g., 0.7 mm in order that the thickness of the liquid crystal panel 14 be small. As shown in FIG. 1, the signal lines 32 extend to one the long sides of the array substrate 20 and are connected to the signal line driving circuit board 15 through TCPs 18. The scanning lines 34 extend to one of the short sides of the array substrate 20 and are connected to the scanning line driving circuit board 16 through TCPs 18.

Figure 2:
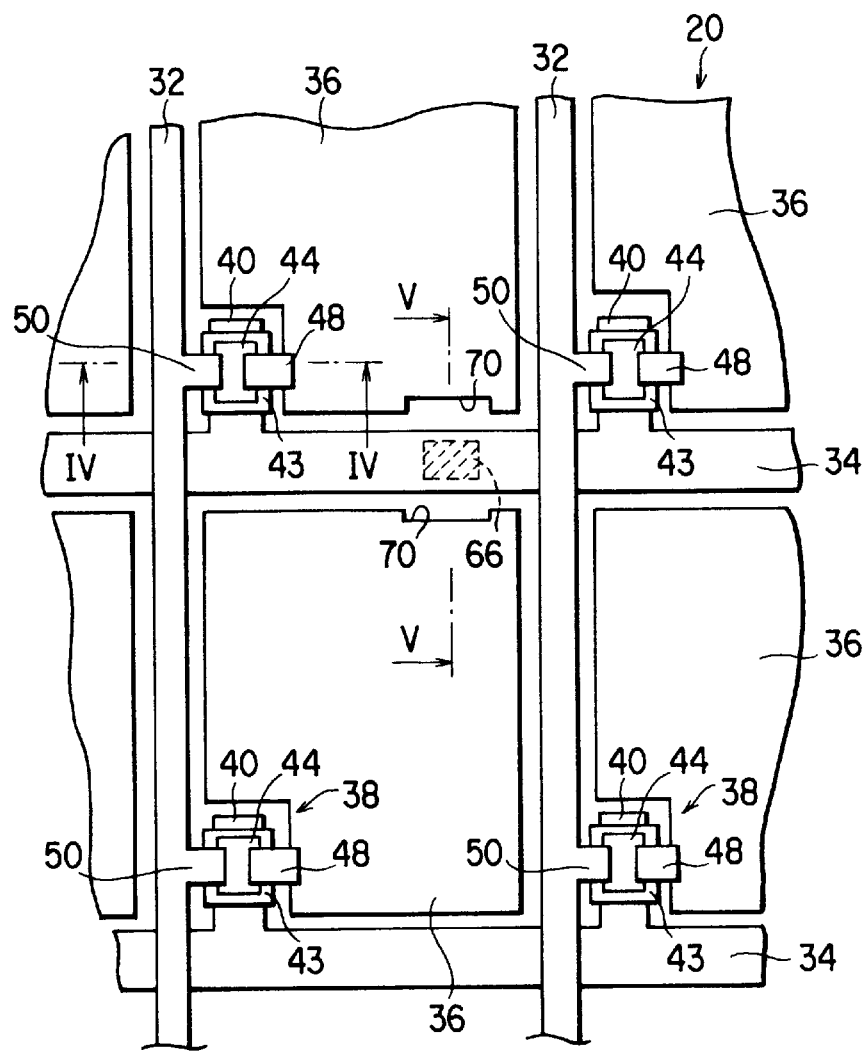
Figure 4:
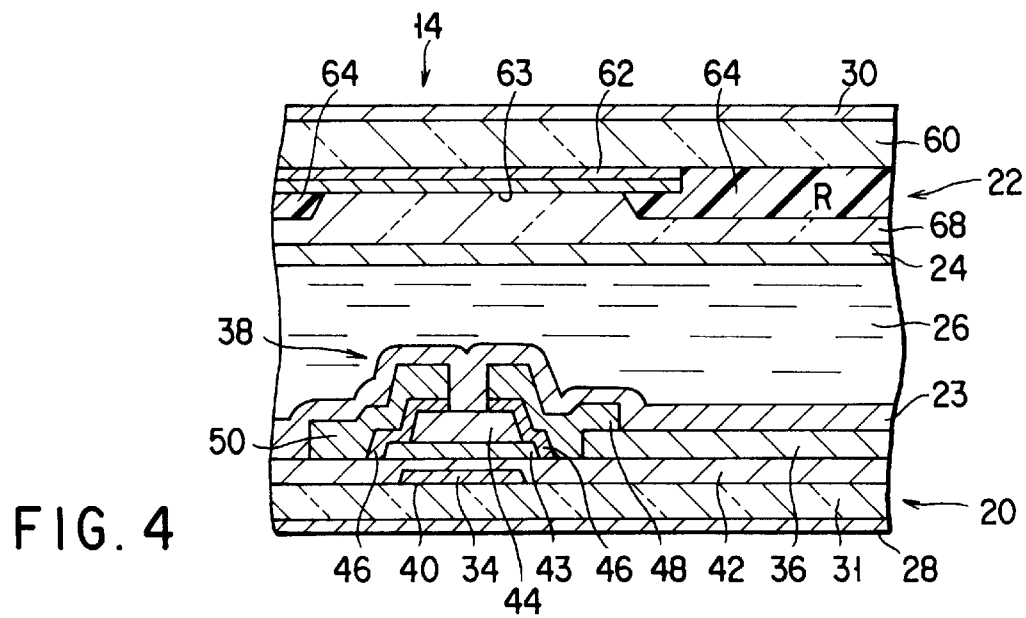

As shown in FIGS. 2 and 4, in each of the TFTs 38, a gate electrode 40 and an insulating film 42 are provided on the gate electrode 40. The insulating film 42 is formed of a silicon oxide layer and a silicon nitride layer which are stacked together. Furthermore, a semiconductor film 43 formed of an a-Si (amorphous silicon) film is provided on the insulating film 42. On the semiconductor film 43 is formed a silicon nitride film serving as a channel protective film 44 which is self-aligned with the scanning line 34. The semiconductor film 43 is electrically connected to the pixel electrode 36 through a source electrode 48 and an n+ type a-Si film serving as a low resistance semiconductor film 46. In addition, the semiconductor film 43 is electrically connected to the signal line 32 through a drain electrode 50 extending from the signal line 32 and an n+-type a-Si film provided as a low resistance semiconductor film 46. An orientation film 23 is formed as the uppermost layer of each TFT 38.

Figure 5:
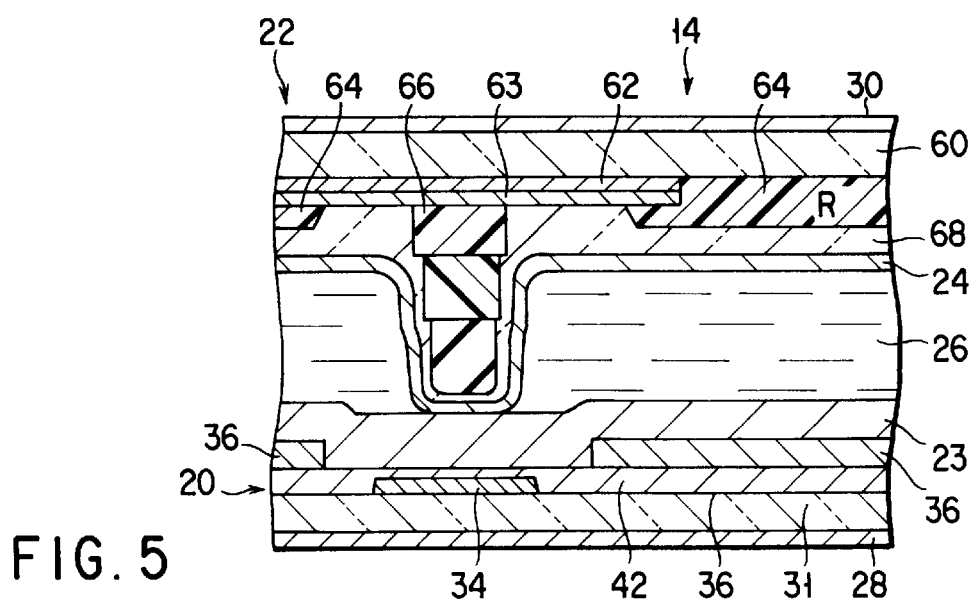

As shown in FIG. 5, the opposite substrate 22 comprises a transparent glass substrate 60 on which first light-shielding layer 62 constituted by an oxide film of chromium (Cr) is provided. A second light-shielding layer 63 formed of chromium (Cr) is provided on the first light-shielding layers 63. The first and second light-shielding layers 62 and 63 are arranged in a matrix so as to shield, from light, the TFTs 38 provided on the array substrate 20, the gaps between the signal lines 32 and the pixel electrodes 36, and the gaps between the scanning lines 34 and the pixel electrodes 36. Color filter 64 including red (R), green (G) and blue (B) colored layers is provided on the glass substrate 60 such that the colored layers are respectively opposite to the pixel electrodes 36 located on the array substrate side. The glass substrate 60 has a small thickness of, e.g., 0.7 mm in order that the liquid crystal panel 14 have a small thickness.

Pillar-shaped spacers 66 formed of insulating material are provided on the second light-shielding layer 63 such that they project toward the array substrate 20 and are respectively opposite to the scanning lines 34 on the array substrate side. To be more specific, each of the pillar-shaped spacers 66 is formed by, e.g., stacking and patterning the colored layers successively during forming the color filter 64. The spacers 66 are tapered toward the array substrate 20. Furthermore, an opposite electrode 68 formed of ITO and the orientation film 24 are successively arranged on the pillar-shaped spacers 66, the color filter layers 64 and the second light-shielding layers 63.

As shown in FIGS. 2 and 5, distal end surfaces of the spacers 66 contact the array substrate 20, with the opposite electrode 68 and the orientation film 24 interposed between the distal end surfaces and the array substrate 20, and are located above the scanning lines 34, when the array substrate 20 and the opposite substrate 22 are adhered to each other as mentioned above. The spacers 66 keep a predetermined gap between the array substrate 20 and the opposite substrate 22.

Figure 3:
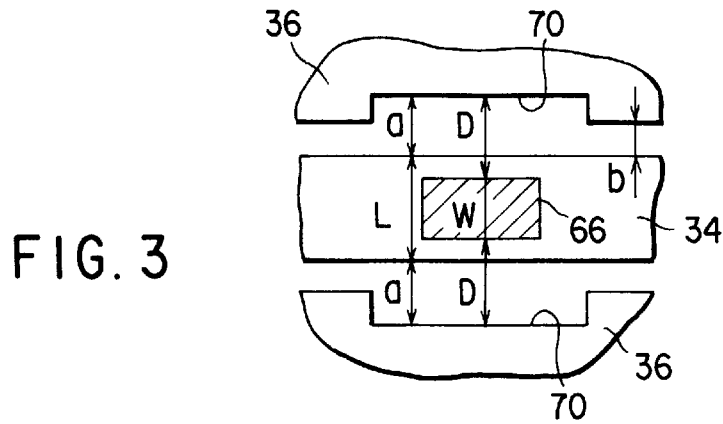

The distal end of each spacer 66 has a width W which, as shown in FIG. 3, is sufficiently smaller than a width L of each scanning line 34, the width W being measured in a direction perpendicular to the scanning line 34.

In order to prevent the contact and short-circuit of the pixel electrode 36 and the opposite electrode 68 covering the spacers 66 in any of the cases where an external force acts on the liquid crystal display device and moves the spacers 66, where the array substrate 20 and the opposite substrate 22 are not accurately positioned relative to each other, and where the position and width of the spacers 66 are inaccurate, a distance D between the distal end of the spacer 66 and the side edge of the pixel electrode 36 which is opposite to the scanning line 34 is given by the following formula:

$$D > C + (E + B) \tag{1}$$

where C is a distance by which the spacer 66 moves relative to the array substrate 20 when an external force acts on the liquid crystal display device, E is a dimensional error in a positional relationship between the array substrate 20 and the opposite substrate 22, which is generated upon adhering the substrates, and B is a dimensional error in the position and width of the spacer 66 which is generated upon manufacturing the same.

However, if the distance D is unnecessarily great, the aperture ratio of the liquid crystal display device 10 greatly lowers. In view of this, in the first embodiment, notches 70 are formed in those portions of side edges of the pixel electrodes 36 opposing the scanning line 34 which are located close to the distal ends of the spacers 66 are located opposite, in order for the distance D to be sufficiently great without decreasing the aperture ratio.

According to the first embodiment, C=7 µm, E=6 µm, and B=5 µm, and thus it is found from the above formula (1) that D=10.3 µm.

Furthermore, the width W of the spacer 66 and a distance a between the scanning line 34 and the pixel electrode 36 have a relationship which satisfies the following formula:

$$L + 2a - 2D > W \tag{2}$$

The spacer 66 is easily formed when the width W is large. However, if the width W is too large, the distance a of the formula (2) must be set at a great value, and the distance between the scanning line 34 and the pixel electrode 36 must also be large, as a result of which the aperture ratio greatly lowers. On the other hand, when the distance a is set at a small value in order to increase the aperture ratio, the width W in the formula (2) becomes minus, and the spacer 66 cannot be formed.

Therefore, as mentioned above, the notches 70 are formed in those portions of the side edges of the pixel electrodes 36 which are located close to the spacer 66, so that lowering of the aperture ratio is restricted as much as possible and the spacers 66 can be easily formed.

In the first embodiment, the distance a is set at 5.3 µm, and the width W is set at 10 µm. Except for those portions of the side edges of the pixel electrodes which has the notches 70, the distance b between the scanning line 34 and the side edges of the pixel electrode is set at 3 µm to increase the aperture ratio.

The sizes, positions and number of the spacers 66 are determined in accordance with the rigidity of the liquid crystal panel 14. The density at which the spacers 66 are disposed is substantially proportional to the rigidity of the liquid crystal panel 14. When the rigidity is too large, the liquid crystal composition 26 greatly shrinks as compared with shrinkage of the liquid crystal panel 14 at a low temperature, and vacuum bubbles generate in a screen. On the other hand, when the rigidity is small, if an external force is applied to the liquid crystal display device 10, those of the spacers 66 on which the force acts break, and the gap between the array and opposite substrates 20 and 22 lacks in uniformity.

According to research, the following relationship is established between the density of the spacers 66, generation of vacuum bubbles under a low temperature condition, and generation of lack in uniformity of the gap between the array and opposite substrates:

In the case where the spacers 66 are provided at a density of 90 µm$^2$ or more per 1 pixel, vacuum bubbles generate under a low temperature condition. In the case where the spacers 66 are arranged at a density of 25 µm$^2$ or less per 1 pixel, when an external force is applied to the liquid crystal display, the gap lacks in the uniformity.

In view of the above research, result, in the first embodiment, two spacers 66 each having a distal end with an area of 100 µm$^2$ are provided per three pixels, in order to prevent generation of vacuum bubbles under a low temperature condition, and to keep the uniformity of the gap even when an external force acts on the liquid crystal display device 10.

With the liquid crystal display device 10 having the above-mentioned structure, the notches 70 are formed in those portions of the side edges of the pixel electrodes which are opposite to the distal ends of the spacers 66, as a result of which the distance between the side edges of the scanning line 34 and the corresponding pixel electrode 36 becomes larger at the regions close to the distal end of the spacer 66 than the other regions. Thus, lowering of the aperture ratio is restricted to a minimum. Even if an external force is applied to the liquid crystal display device 10 and the spacers 66 moves relative to the array substrate 20, the opposite electrode 68 and the pixel electrodes 36 can be prevented from contacting with each other and short-circuiting, thus preventing generation of luminescent spots. For the same reason, the array substrate 20 and the opposite substrate 22 are prevented from short-circuiting, even when they deform as a result of an increase in the size of the liquid crystal panel 14 and execution of processing involving high heat. Therefore, an excellent image can be obtained.

Moreover, generation of vacuum bubbles are prevented even at a low temperature, and the gap can be uniformly kept at the predetermined value even if an external force acts on the liquid crystal display device. Thus, there can be obtained a liquid crystal display device which can display a high quality image. In addition, it is not necessary to pattern the opposite electrode 68 or change the manufacturing steps of the color filter 64, so that the liquid crystal display device can be easily formed at a low cost.

Next, a liquid crystal display device according to a second embodiment of the present invention will be explained.

Figure 6:
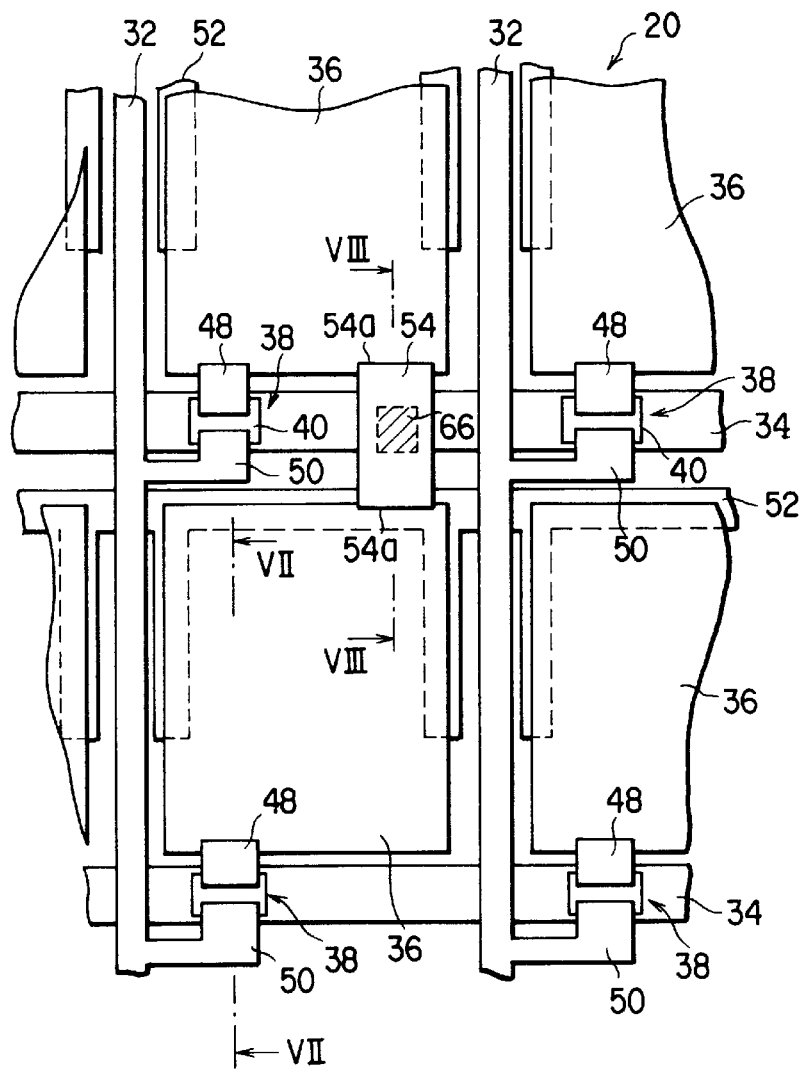
Figure 7:
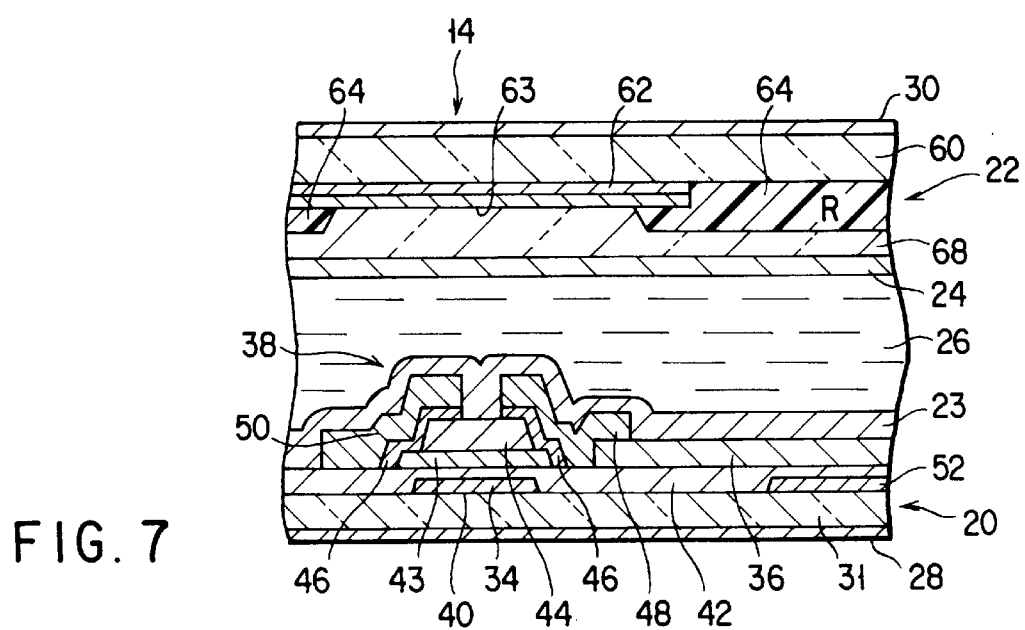
Figure 8:
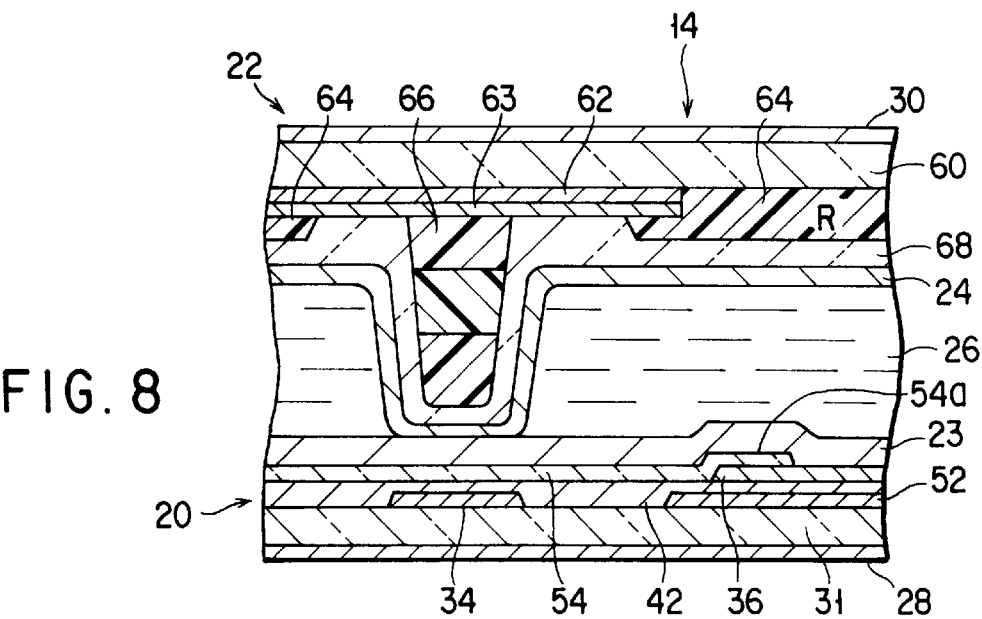

In the second embodiment, as shown in FIGS. 6 to 8, the array substrate 20 has a glass substrate 31 on which 640×3 signal lines 32 and 480 scanning lines 34 are arranged as wiring lines in a matrix manner such that the signal lines 32 extend in a direction substantially perpendicular to the scanning lines 34. Pixel electrodes 36 are respectively disposed in regions surrounded by the signal lines 32 and the scanning lines 34, and connected to the intersections of the signal and scanning lines 32 and 34 through TFTs 38 serving as switching elements.

In each of the TFTs 38, the scanning line 34 itself is used as a gate electrode 40, and an insulating film 42 is provided on the gate electrode 40. The insulating film 42 includes silicon oxide and silicon nitride which are stacked together. Furthermore, a semiconductor film 43 formed of an a-Si: H film is arranged on the insulating film 42, and a silicon nitride film is formed on the semiconductor film 43 and serves as a channel protective film 44 which is self-aligned with the scanning line 34. The semiconductor film 43 is electrically connected to the pixel electrode 36 through a source electrode 48 and an n$^+$ type a-Si: H film serving as a low resistance semiconductor film 46. In addition, the semiconductor film 43 is electrically connected to the signal line 32 through a drain electrode 50 extending from the signal line 32 and an n$^+$ type a-Si: H film provided as a low resistance semiconductor film 46.

On the glass substrate 31, auxiliary capacitance lines 52 are formed to extend substantially parallel to the scanning lines 34. The pixel electrodes 36 and the auxiliary capacitance lines 52 provide auxiliary capacitance (Cs).

The array substrate 20 has a plurality of spacer insulating layers 54 which are located so as to overlap the respective spacers 66 of the opposite substrate 20 as viewed from above. The spacer insulating layers 54 are located above the scanning lines 34, and have a substantially rectangular shape. In addition, each of the spacer insulating layers 54 has extending portions 54a at its both ends, which extend in a direction substantially in parallel to the signal lines 32 and over peripheral portions of the pixel electrodes 36 located on the both sides of the associated scanning line 34. Thus, each of the spacer insulating layer 54 has an area larger than that of the distal end surface of the pillar-shaped spacer 66, e.g., three times thereof. Each spacer insulating layer 54 is formed of transparent material having a transmittance of 30% or more, and has a thickness of 2 µm or less.

On the other hand, the opposite substrate 22 comprises a transparent glass substrate 60, first light-shielding layers 62 each of which is constituted by an oxide film formed of chromium (Cr) and provided on the glass substrate 60, and second light-shielding layers 63 each of which is constituted by an oxide film formed of chromium (Cr) and provided on the first light-shielding layers 63. The first and second light-shielding layers 62 and 63 are arranged in a matrix to shield, from light, the TFTs 38 provided on the array substrate 20, the gaps between the signal lines 32 and the pixel electrodes 36, and between the scanning lines 34 and the pixel electrodes 36. A color filter 64 including red (R), green (G) and blue (B) colored layers are formed on the glass substrate 60 such that they are respectively opposite to the pixel electrodes 36 located on the array substrate side. The glass 60 is formed to have a small thickness of, e.g., 0.7 mm in order that the liquid crystal panel 14 have a small thickness.

Pillar-shaped spacers 66 formed of insulating material are provided on the second light-shielding layers 63 such that they extend toward the array substrate side and are respectively opposite to the scanning lines 34 and the spacer insulating layers 54 which are provided on the array substrate side. Each of the pillar-shaped spacers 66 is formed by, e.g., stacking and patterning the colored layers successively during forming the color filter 64. The spacers 66 are tapered from the array substrate side toward the array substrate side. Furthermore, the distal end surface of each spacer 66, which is located on the array substrate side, has a width smaller than the width of the scanning line 34, and an area sufficiently smaller than the area of the spacer insulating layer 54. An opposite electrode 68 formed of ITO and an orientation film 24 are successively arranged on the spacers 66, the color filter layers 64 and the second light-shielding layers 63.

The distal end surfaces of the spacers 66 contact the respective spacer insulating layers 54 on the array substrate 20, with the opposite electrode 68 and the orientation films 23 and 24 interposed between the distal end surfaces and the spacer insulating layers 54, when the array substrate 20 are adhered to the opposite substrate 22. As a result, the spacers 66 keep the gap between the array substrate 20 and the opposite substrate 22 at a predetermined value.

With the active matrix liquid crystal display device 10 having the above-mentioned construction, the spacer insulating layers 54 are provided at those regions of the array substrate 20 which are opposite and close to the distal ends of the spacers 66 extending from the opposite substrate 22, and each of the spacer insulating layers 54 has an area which is sufficiently greater than the area of the distal end of the spacer 66. Due to this feature, even if the array substrate 20 and the opposite substrate 22 are deformed due to an external force and the spacers 66 move over the array substrate, the spacer insulating layers 54 are always located between the spacers 66 and the pixel electrodes 36 and thus the pixel electrodes and the opposite electrode are prevented from short-circuiting. Accordingly, generation of luminance spots can be prevented, thus obtaining an excellent display image. Furthermore, for the same reason as in the above explanation, the substrates 20 and 22 are prevented from short-circuiting and an excellent image can be provided, even if they are deformed as a result of an increase in the size of the liquid crystal panel 14 and execution of processing involving high heat.

Furthermore, each spacer insulating layer 54 is formed of transparent material having a transmittance of 30% or more, and has a thickness of 2 μm or less. Thus, even when the extending portions 54a of each spacer insulating layer 54 overlap with the peripheral portions of the pixel electrodes 36 located both sides of the insulating layer 54, they do not decrease the aperture ratio of the liquid crystal panel 14 or degrade the display image. In addition, the spacer insulating layers 54 do not disorder the orientation of the liquid crystal composition 26. Therefore, the excellent image can be obtained.

The present invention is not limited to the above embodiments, and various changes and modifications may be made without departing from the scope of the general inventive concept as defined by the appended claims and their equivalents.

Figure 9:
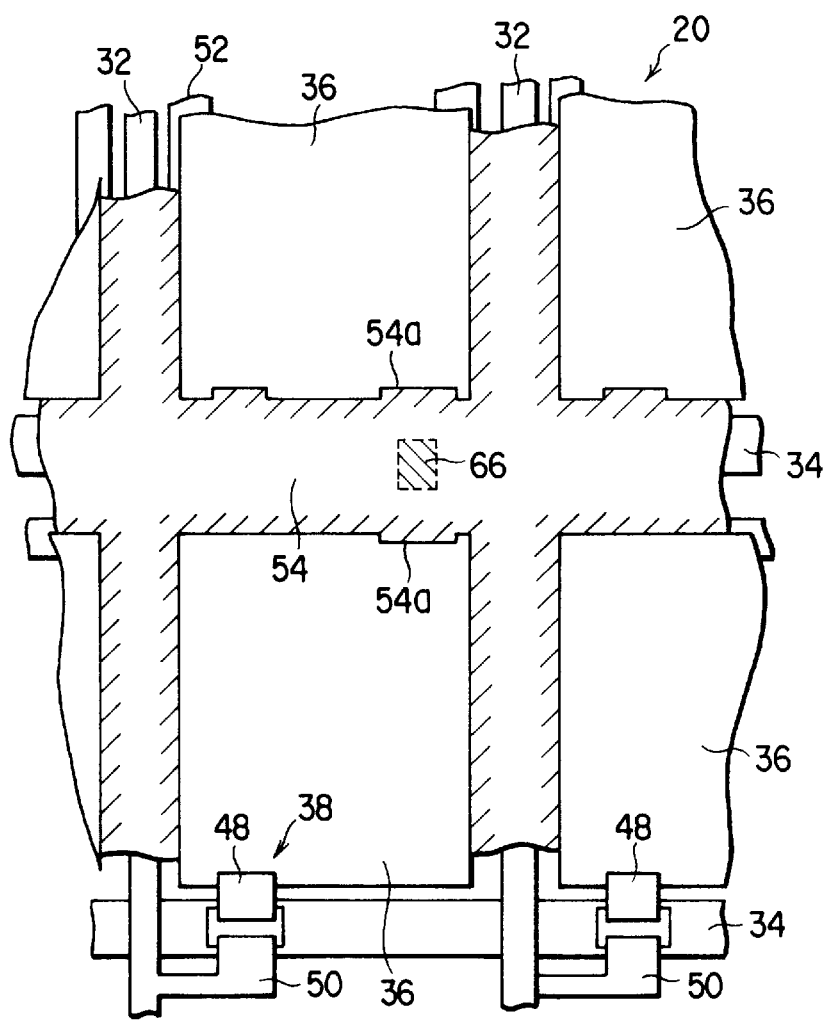
FIG. 9 is a schematic plan view showing a part of an array substrate of a liquid crystal display device according to a modification of the second embodiment.

For example, in the second embodiment, the spacer insulating layers 54 are provided only on the regions opposing the spacers 66. However, as shown in FIG. 9, an integrated transparent insulating layer 54 may be formed in a matrix pattern so as to cover the gaps between the pixel electrodes 36, and may be integrally provided with extending portions 54a at regions opposing and closing the distal ends of the spacers 66. In this structure also, the same advantages can be obtained as in the first and second embodiments.

Moreover, in the first and second embodiments, the spacers 66 are located above the scanning lines 34. However, they may be arranged above the signal lines 32. In addition, the dimensions of the structural elements are not limited to the values specified in the above explanations of the first and second embodiments. Accordingly, with respect to the dimensions also, various modifications may be made as occasion requires.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   an array substrate including wiring lines arranged in a matrix, and a plurality of pixel electrodes disposed in respective regions surrounded by the wiring lines and connected to the wiring lines through switching elements, respectively;
   an opposite substrate including an opposite electrode and opposing the array substrate with a predetermined gap; and
   a liquid crystal composition sealed between the array substrate and the opposite substrate;
   the opposite substrate having a plurality of pillar-shaped spacers which project to contact the array substrate through the opposite electrode and have distal ends located opposite to the wiring lines,
   each of the distal ends having a width smaller than a width of each of the wiring lines, and
   the distance between each of the pixel electrodes, located near the distal ends of the spacers and the corresponding wiring lines opposing said pixel electrodes, being larger at regions around the distal ends of the spacers than other regions.

2. A liquid crystal display device according to claim 1, wherein the pixel electrodes have outer edges which are located opposite to the wiring lines, and which have notches formed in those portions of the outer edges which are opposite to the distal ends of the spacers.

3. A liquid crystal display device according to claim 2, wherein the opposite substrate has color filter opposing the pixel electrodes, and each of the spacers is formed of a part of the color filter.

4. A liquid crystal display device according to claim 2, wherein the spacers are tapered from the opposite substrate toward the array substrate.

5. A liquid crystal display device comprising:
   an array substrate including wiring lines arranged in a matrix, and a plurality of pixel electrodes which are disposed in regions surrounded by the wiring lines and connected to the wiring lines through switching elements, respectively;
   an opposite substrate including an opposite electrode and opposing the array substrate with a predetermined gap; and
   a liquid crystal composition sealed between the array substrate and the opposite substrate;
   the opposite substrate having a plurality of pillar-shaped spacers which project to contact the array substrate through the opposite electrode and have distal ends located opposite to the wiring lines, and
   the array substrate having a plurality of transparent insulating layers arranged on those regions of the array substrate which are opposite to the distal ends of the spacers, each of the transparent insulating layers having an area greater than an area of each of the distal ends of the spacers and having an extending portion overlapping with a part of the pixel electrode.

6. A liquid crystal display device according to claim 5, wherein each of the insulating layers has a transmittance of 30% or more.

7. A liquid crystal display device according to claim 5, wherein each of the insulating layers has a thickness of 2 $\mu$m or less.

8. A liquid crystal display device according to claim 5, wherein the opposite substrate has a color filter located opposite to the pixel electrodes, and each of the spacers is formed of a part of the color filters.

9. A liquid crystal display device according to claim 5, wherein the spacers are tapered from the opposite substrate toward the array substrate.

10. A liquid crystal display device comprising:
   an array substrate including wiring lines arranged in a matrix, a plurality of pixel electrodes disposed in regions surrounded by the wiring lines and connected to the wiring lines through switching elements, and a transparent insulating layer formed in a matrix on the wiring lines and covering gaps between the pixel electrodes;
   an opposite substrate including an opposite electrode and located opposite to the array substrate; and
   a liquid crystal composition sealed between the array substrate and the opposite substrate;
   the opposite substrate having a plurality of pillar-shaped spacers which project toward the array substrate and have distal ends contacting the insulating layer through the opposite electrode, and
   the insulating layer having a plurality of extending portions, any adjacent two of which extend only from the vicinity of the distal end of one spacer in opposite directions and overlap peripheral portions of two adjacent pixel electrodes.

11. A liquid crystal display device according to claim 10, wherein the transparent insulating layer has a transmittance of 30% or more.

12. A liquid crystal display device according to claim 10, wherein the transparent insulating layer has a thickness of 2 $\mu$m or less.

13. A liquid crystal display device according to claim 10, wherein the opposite substrate has a color filter opposing the pixel electrodes, and each of the spacers is formed of a part of the color filter.

14. A liquid crystal display device according to claim 10, wherein each of the spacers is tapered from the opposite substrate toward the array substrate.

* * * * *